(12) United States Patent
Yamaoka

(10) Patent No.: US 9,906,638 B2
(45) Date of Patent: Feb. 27, 2018

(54) CONTROL METHOD, TERMINAL APPARATUS, AND STORAGE MEDIUM

(71) Applicant: FUJITSU LIMITED, Kawasaki-shi, Kanagawa (JP)

(72) Inventor: Hisatoshi Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/187,194

(22) Filed: Jun. 20, 2016

(65) Prior Publication Data

US 2017/0070301 A1 Mar. 9, 2017

(30) Foreign Application Priority Data

Sep. 4, 2015 (JP) .................. 2015-175056

(51) Int. Cl.
*H04M 3/00* (2006.01)
*H04M 1/725* (2006.01)

(52) U.S. Cl.
CPC .............. *H04M 1/72519* (2013.01)

(58) Field of Classification Search
CPC ....... H04W 12/08; H04W 12/06; H04W 4/02; H04W 4/008; H04W 4/021; H04W 4/14; H04W 4/20; H04W 48/02; H04W 28/0289; H04W 48/04; H04W 4/028; H04W 4/043; H04W 4/027; H04W 36/0061; H04W 36/08; H04W 4/023; H04W 4/027; H04W 4/12; H04W 4/00; H04W 4/04; H04L 1/0057; H04L 1/00; H04L 1/0072; H04L 27/2613; H04L 5/0053; H04L 27/2675; H04L 1/0045; H04L 5/0037; H04L 1/1812; H04L 1/0625; H04L 2209/80; H04L 25/067; H04L 67/18; H04L 67/22; H04L 67/02; H04L 67/10; H04L 65/403; H04L 67/306; H04L 51/20; H04L 12/282; H04L 2012/2841; H04L 41/0813
See application file for complete search history.

(56) References Cited

U.S. PATENT DOCUMENTS

| | | | |
|---|---|---|---|
| 2008/0001812 A1* | 1/2008 | Jalali | H04B 7/0408 342/354 |
| 2009/0253423 A1* | 10/2009 | Kullberg | H04M 1/66 455/419 |
| 2009/0284350 A1 | 11/2009 | Konishi et al. | |
| 2012/0202185 A1* | 8/2012 | Jabara | G09B 5/00 434/350 |

(Continued)

FOREIGN PATENT DOCUMENTS

| | | |
|---|---|---|
| JP | 2008-39688 | 2/2008 |
| JP | 2009-199431 | 9/2009 |
| WO | WO 2007/058301 A1 | 5/2007 |

*Primary Examiner* — Nimesh Patel
(74) *Attorney, Agent, or Firm* — Staas & Halsey LLP

(57) ABSTRACT

A control method executed by a system including a beacon and a computer capable of executing an application, the control method includes receiving a radio wave from the beacon; generating a pattern of transition in reception intensity of the received radio wave; generating a profile of a temporal change by simplifying the generated pattern of transition; comparing the generated profile with at least one of a plurality of reference profiles different from each other; and determining how to control the application in accordance with a result of the comparing.

12 Claims, 14 Drawing Sheets

(56) References Cited

U.S. PATENT DOCUMENTS

| | | | |
|---|---|---|---|
| 2013/0262203 A1* | 10/2013 | Frederick | G06Q 30/0209 |
| | | | 705/14.12 |
| 2014/0140442 A1* | 5/2014 | Hoogerbrugge | H04R 25/453 |
| | | | 375/317 |
| 2015/0016337 A1* | 1/2015 | Chung | H04W 56/0085 |
| | | | 370/328 |
| 2015/0223053 A1* | 8/2015 | Gillin, IV | G09B 5/06 |
| | | | 455/418 |
| 2016/0029204 A1* | 1/2016 | Lalwaney | H04W 8/22 |
| | | | 455/418 |

\* cited by examiner

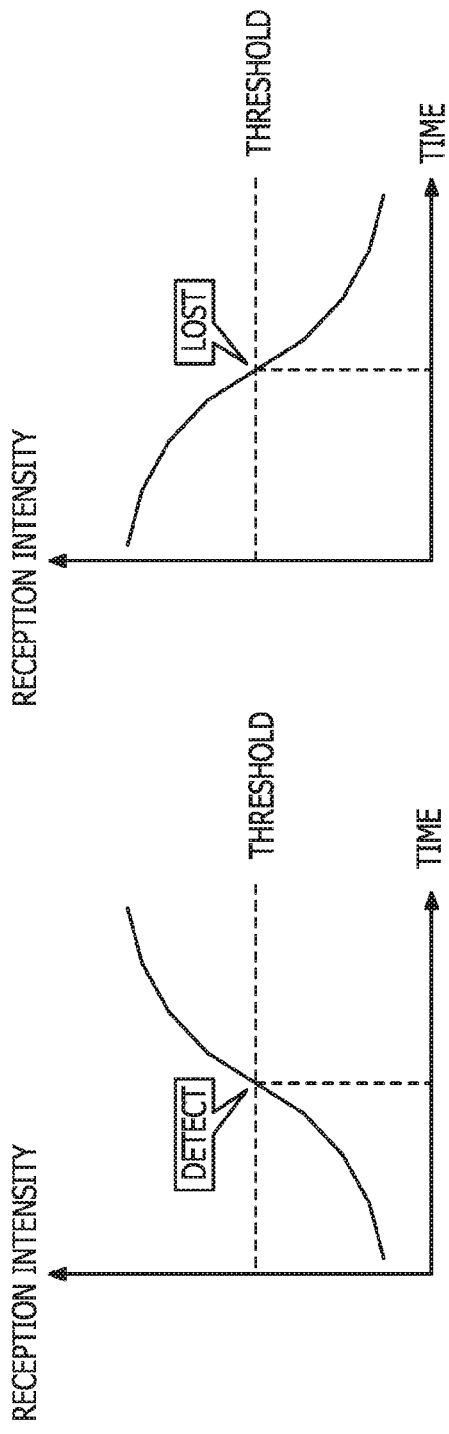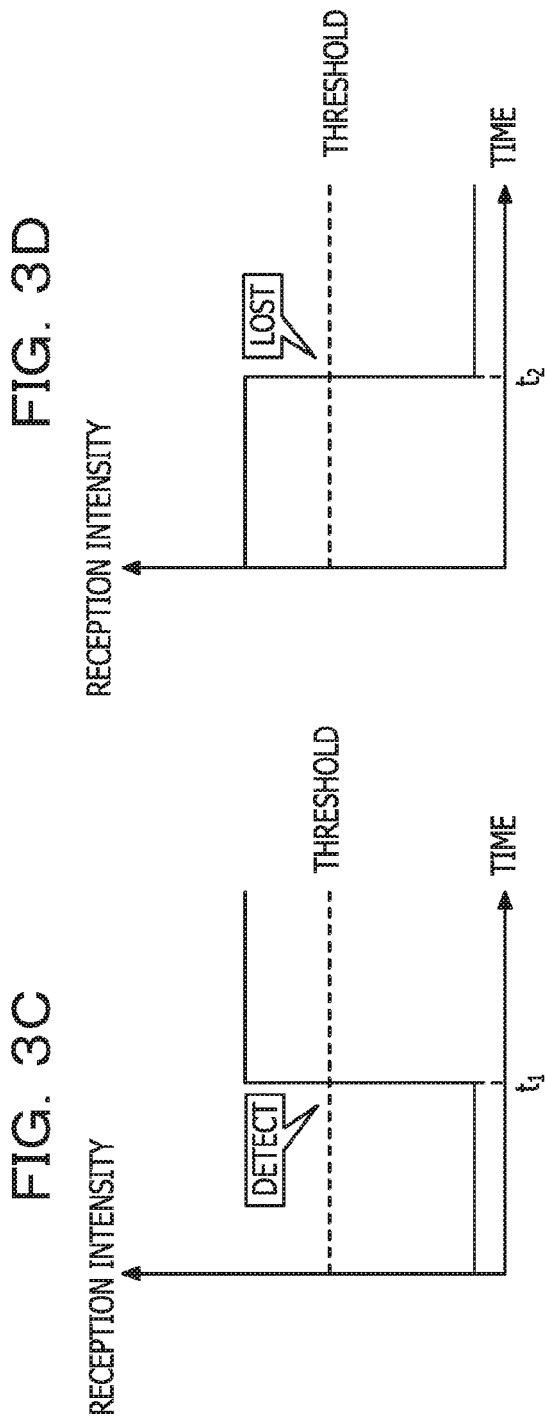

FIG. 6
| PATTERN ID | STANDARDIZED PATTERN INFORMATION |
|---|---|
| P001 | 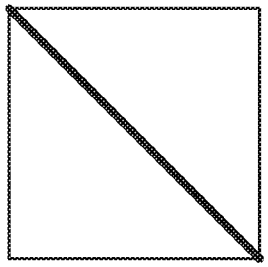 |
| P002 | 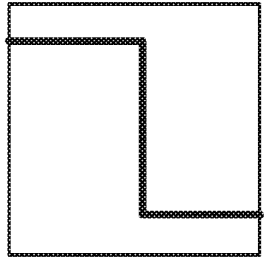 |
| P003 | 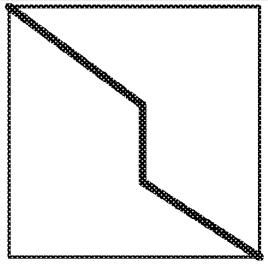 |
| ... | ... |
630D FIG. 7
| BEACON ID | REFERENCE PROFILE |
|---|---|
| B001 | 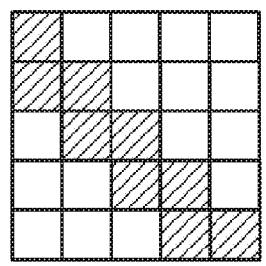 |
| B002 | 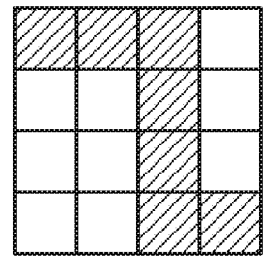 |
| ... | ... |

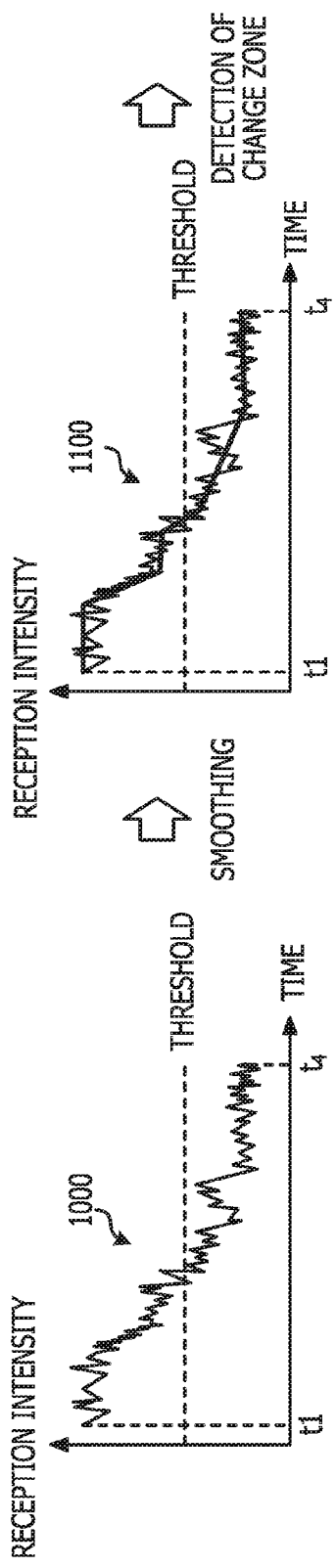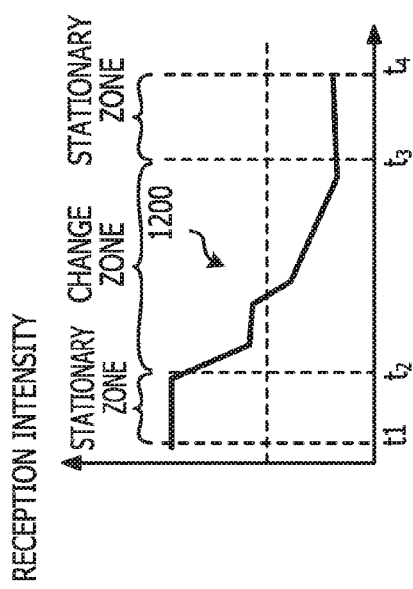

FIG. 11

| N | 2 | 3 | 4 | 5 | 6 |
|---|---|---|---|---|---|
| CHANGE ZONE INFORMATION | | | | | |
| STANDARDIZED PATTERN INFORMATION | | | | | |
| DIVISION PARAMETER | 4 | 9 | 16 | 25 | 36 |
| HAMMING DISTANCE | 0 | 2 | 4 | 8 | 10 |
| GAIN (= HAMMING DISTANCE/DIVISION PARAMETER) | 0 | 0.22 | 0.25 | 0.32 | 0.27 |

FIG. 13
| PATTERN ID | STANDARDIZED PATTERN INFORMATION |
|---|---|
| P001 | 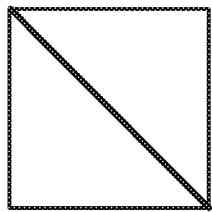 |
| P002 | 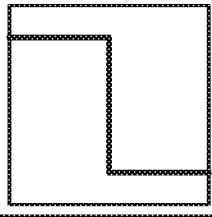 |
| P003 | 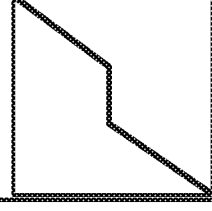 |
| ... | ... |
SELECT STANDARDIZED PATTERN

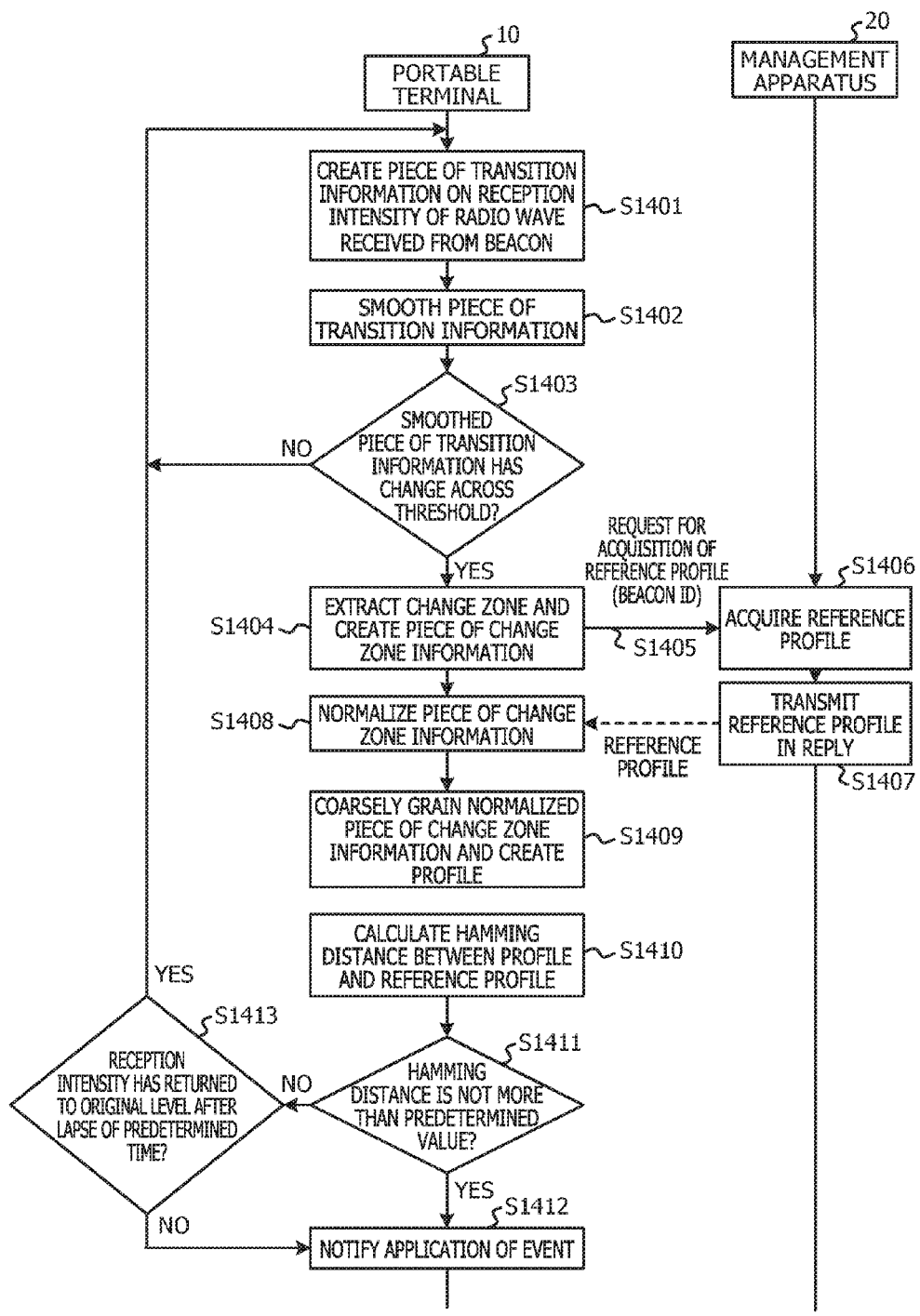

CONTROL METHOD, TERMINAL APPARATUS, AND STORAGE MEDIUM

CROSS-REFERENCE TO RELATED APPLICATION

This application is based upon and claims the benefit of priority of the prior Japanese Patent Application No. 2015-175056, filed on Sep. 4, 2015, the entire contents of which are incorporated herein by reference.

FIELD

The embodiment discussed herein is related to a control method, a terminal apparatus, and a storage medium.

BACKGROUND

A technique has been known in which the reception intensity of radio waves sent out from a beacon is measured by a portable terminal, such as a smartphone or a tablet terminal, and presence (a visit) of a user of the portable terminal within (to) a specific area is sensed when the measured reception intensity exceeds a threshold.

A service is known which, if a visit of a user of a portable terminal is sensed, executes an application corresponding to an area where the visit is sensed. For example, International Publication Pamphlet No. WO 2007/058301, Japanese Laid-open Patent Publication No. 2008-39688, Japanese Laid-open Patent Publication No. 2009-199431, and the like are disclosed as related art.

The above-described conventional technique, however, may cause, for example, a case where a user of a portable terminal within a specific area is erroneously sensed not being within the area.

The reception intensity of radio waves received by the portable terminal varies due to various factors, such as movement of the user of the portable terminal into the shadows, or fluctuations in radio waves sent out from a beacon. For this reason, even though the user of the portable terminal is within the area, the reception intensity may drop to not more than a threshold momentarily, and the user may be erroneously sensed not being within the area.

As a result, execution of an application may end in spite of the presence of the user of the portable terminal within the specific area. From the foregoing, it is desirable to improve the quality of an application service using a beacon.

SUMMARY

According to an aspect of the invention, a control method executed by a system including a beacon and a computer capable of executing an application, the control method includes receiving a radio wave from the beacon; generating a pattern of transition in reception intensity of the received radio wave; generating a profile of a temporal change by simplifying the generated pattern of transition; comparing the generated profile with at least one of a plurality of reference profiles different from each other; and determining how to control the application in accordance with a result of the comparing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A, 3B, 3C, and 3D are each a chart for explaining an example of a pattern of transition in reception intensity corresponding to a scene of usage;

FIG. 6 is a chart schematically illustrating an example of a standardized pattern information table;

FIG. 7 is a chart schematically illustrating an example of a reference profile table;

FIGS. 9A, 9B, and 9C are charts for explaining a process from smoothing of a piece of transition information on reception intensity to detection of a change zone;

FIG. 11 is a chart for explaining coarse graining, Hamming distance calculation, and gain calculation;

FIG. 13 is a chart illustrating a standardized pattern selection screen; and

FIG. 14 is a chart illustrating an example of an application control process according to the present embodiment.

DESCRIPTION OF EMBODIMENT

An embodiment will be described below with reference to the accompanying drawings.

Figure 1:
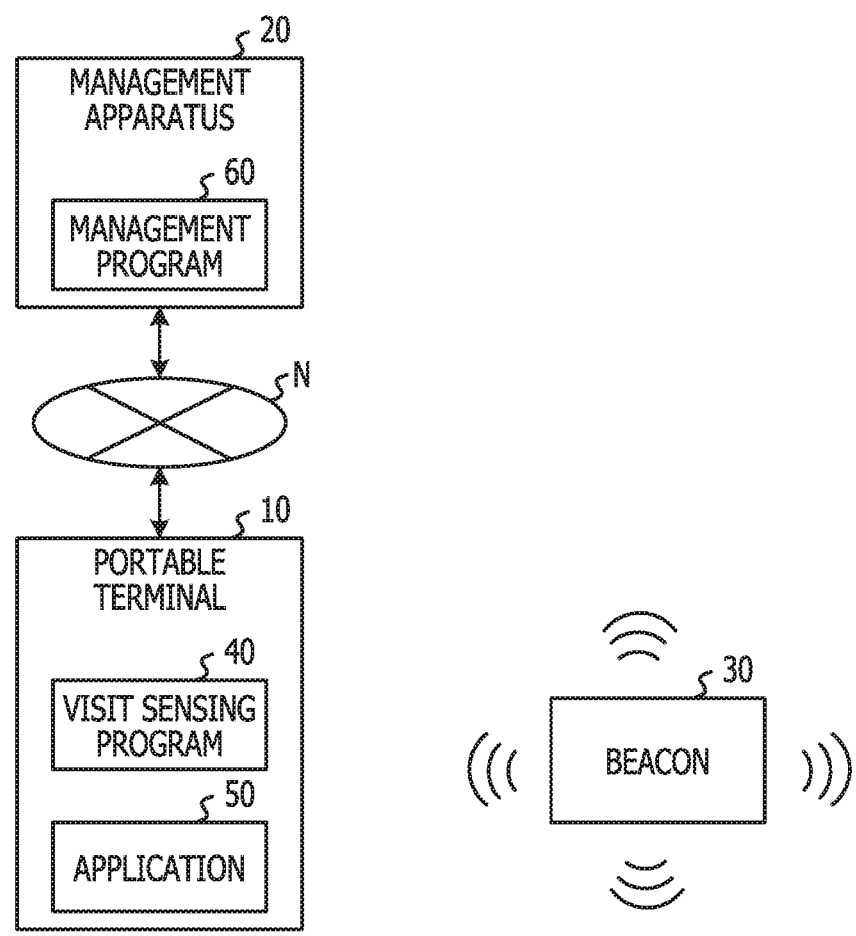
FIG. 1 is a diagram illustrating an example of the overall configuration of a service provision system according to the present embodiment.

The overall configuration of a service provision system according to the present embodiment will be described first with reference to FIG. 1. FIG. 1 is a diagram illustrating an example of the overall configuration of the service provision system according to the present embodiment.

A service provision system 1 according to the present embodiment includes one or more portable terminals 10, a management apparatus 20, and one or more beacons 30. The portable terminal 10 and the management apparatus 20 are coupled via a network N, such as a telephone network or the Internet, so as to be capable of communication with each other.

The portable terminal 10 is an information processing terminal, such as a smartphone or a tablet terminal, which a user is able to carry with ease. A visit sensing program 40 which senses, based on the reception intensity of radio waves sent out from the beacon 30, that the portable terminal 10 has entered into a specific area (a detected state) and that the portable terminal 10 has moved away from the specific area (a lost state) is installed on the portable terminal 10. An application 50, execution of which is controlled in accordance with a result of sensing by the visit sensing program 40, is installed on the portable terminal 10.

The portable terminal 10 is capable of providing a service, such as a function or content, to be implemented by the application 50 to a user of the portable terminal 10 by causing the visit sensing program 40 to control execution of the application 50 in accordance with a sensing result.

At this time, the portable terminal 10 according to the present embodiment judges whether to control execution of the application 50, based on a profile obtained by simplifying a pattern of transition in reception intensity, for which a detected state or a lost state is sensed. For this reason, the portable terminal 10 according to the present embodiment is capable of inhibiting the application 50 from being ended (or activated) if, for example, a lost state (or a detected state) is momentarily sensed due to fluctuations in radio waves or the like.

The management apparatus 20 is a server apparatus which includes, for example, one or more information processing apparatuses. A management program 60 which manages, for each beacon 30, a profile obtained by simplifying a pattern of transition in reception intensity, for which a detected state or a lost state is sensed in the portable terminal 10, is installed on the management apparatus 20. A profile to be managed in the management apparatus 20 is referred to as a "reference profile".

The beacon 30 is a sending apparatus which sends out radio waves (radio waves including a signal indicating an advertisement for, for example, use of Bluetooth Low Energy (BLE)) using Wi-Fi®, BLE, or the like. A piece of identification information (a beacon ID) for uniquely identifying the beacon 30 is assigned to the beacon 30.

In the service provision system 1 illustrated in FIG. 1, the portable terminal 10 and the management apparatus 20 are implemented as different apparatuses. However, the portable terminal 10 and the management apparatus 20 may be implemented as one apparatus by, for example, the portable terminal 10 implementing a function of the management apparatus 20.

Figure 2A:
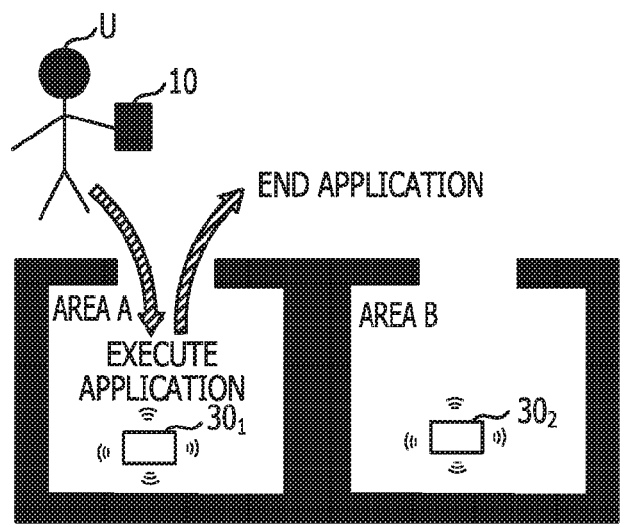
FIGS. 2A and 2B are each a diagram for explaining an example of a scene of usage.
Figure 2B:
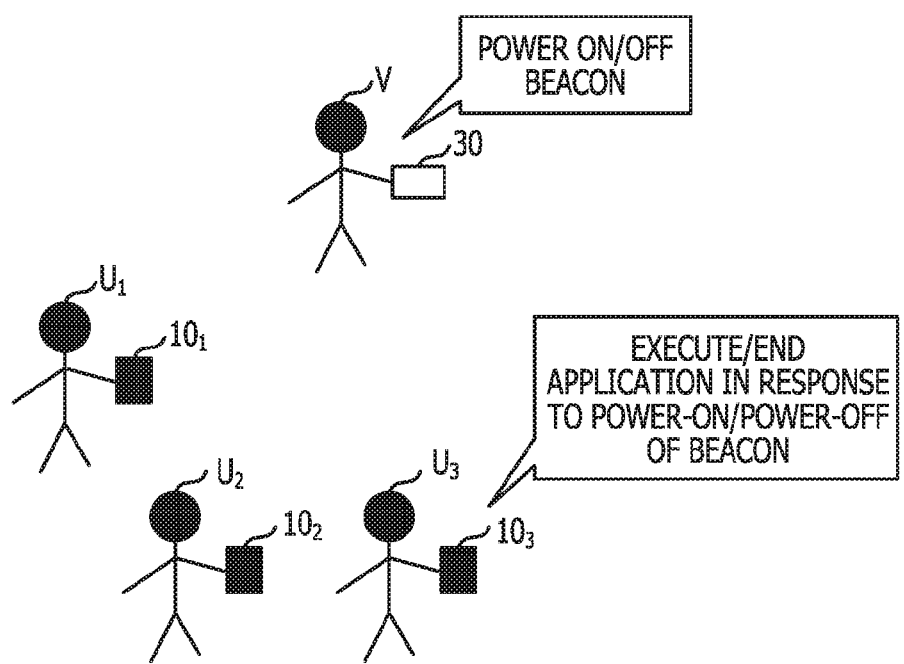

Scenes of usage of the service provision system 1 according to the present embodiment will be described with reference to FIGS. 2A and 2B. FIGS. 2A and 2B are each a diagram for explaining an example of a scene of usage.

FIG. 2A illustrates a scene of usage in a case where execution of the application 50 is controlled based on the reception intensity of radio waves received from the beacon 30 installed in a specific area. In FIG. 2A, a beacon $30_1$ and a beacon $30_2$ are installed in an area A and an area B, respectively, which are, for example, classrooms of a university. In this case, the portable terminal 10 of a user U measures the reception intensity of radio waves received from each of the beacons $30_1$ and $30_2$ by the visit sensing program 40.

If the user U of the portable terminal 10 enters into, for example, the area A, the portable terminal 10 senses, by the visit sensing program 40, that the portable terminal 10 has entered into the area A (a detected state), based on the reception intensity of radio waves received from the beacon $30_1$. The portable terminal 10 then judges, by the visit sensing program 40, whether to control execution of the application 50, based on a profile which is obtained by simplifying a transition in the reception intensity of radio waves received from the beacon $30_1$ and a reference profile for a case where a detected state is sensed.

If the visit sensing program 40 judges that execution of the application 50 is to be controlled, the portable terminal 10 executes the application 50 corresponding to the area A (the application 50 corresponding to the beacon $30_1$ installed in the area A).

If the user U of the portable terminal 10 exits (moves away) from, for example, the area A, the portable terminal 10 senses, by the visit sensing program 40, that the portable terminal 10 has moved away from the area A (a lost state), based on the reception intensity of radio waves received from the beacon $30_1$. The portable terminal 10 then judges, by the visit sensing program 40, whether to control execution of the application 50, based on a profile which is obtained by simplifying a transition in the reception intensity of radio waves received from the beacon $30_1$ and a reference profile for a case where a lost state is sensed.

If the visit sensing program 40 judges that execution of the application 50 is to be controlled, the portable terminal 10 ends the application 50 corresponding to the area A (the application 50 corresponding to the beacon $30_1$ installed in the area A).

As described above, the service provision system 1 according to the present embodiment executes (or ends) the application 50 corresponding to the beacon 30 installed in a specific area where the beacon 30 is installed, in response to an entry (or an exit) of a user of the portable terminal 10 into (or from) the area. For this reason, in the service provision system 1 according to the present embodiment, the corresponding application 50 is capable of providing content or the like corresponding to the area to a user.

Advance installment of the beacon 30 in a specific area as illustrated in FIG. 2A is called "location-designated". If the beacon 30 is used in a location-designated manner, when the portable terminal 10 enters into or exits from the specific area where the beacon 30 is installed, the portable terminal 10 senses a detected state or a lost state. In this case, the portable terminal 10 controls execution of the application 50 in accordance with a location (an area) in response to the sensing of the detected state or the lost state.

FIG. 2B illustrates a scene of usage in a case where execution of the application 50 is controlled based on the reception intensity of radio waves received from the beacon 30 that is powered on or off at a specific time. In FIG. 2B, for example, a user V as a lecturer has the beacon 30 in an area a, such as a classroom of a university. Users $U_1$ to $U_3$ as students have respective portable terminals $10_1$ to $10_3$.

Assume that the user V as the lecturer powers on the beacon 30 at a time, such as the start of a class. The portable terminals $10_1$ to $10_3$ of the users $U_1$ to $U_3$ as the students each measure the reception intensity of radio waves received from the beacon 30 by the visit sensing program 40 to sense that the beacon 30 is powered on (a detected state). Then, the portable terminals $10_1$ to $10_3$ each judge, by the visit sensing program 40, whether to control execution of the application 50, based on a profile obtained by simplifying a transition in the reception intensity of radio waves received from the beacon 30 and a reference profile for a case where a detected state is sensed.

If the visit sensing program 40 judges that execution of the application 50 is to be controlled, the portable terminals $10_1$ to $10_3$ execute the application 50 corresponding to the beacon 30.

Assume that the user V as the lecturer powers off the beacon 30 at a time, such as the end of a class. The portable terminals $10_1$ to $10_3$ of the users $U_1$ to $U_3$ as the students each sense, by the visit sensing program 40, that the beacon 30 is powered off (a lost state). The portable terminals $10_1$ to $10_3$ each judge, by the visit sensing program 40, whether to control execution of the application 50, based on a profile obtained by simplifying a transition in the reception intensity of radio waves received from the beacon 30 and a reference profile for a case where a lost state is sensed.

If the visit sensing program 40 judges that execution of the application 50 is to be controlled, the portable terminals $10_1$ to $10_3$ end the application 50 corresponding to the beacon 30.

As described above, the service provision system 1 according to the present embodiment executes or ends the application 50 corresponding to the beacon 30 in response to power-on or power-off of the corresponding beacon 30. With this configuration, the service provision system 1 according to the present embodiment is capable of providing content or the like corresponding to a situation to a user by the application 50 in question.

Power-on or power-off of the beacon 30 at a specific time as illustrated in FIG. 2B is called "situation-designated". If the beacon 30 is used in a situation-designated manner, the portable terminal 10 present in the same area senses a detected state or a lost state in response to power-on or power-off of the beacon 30. In this case, the portable terminal 10 controls execution of the application 50 in accordance with the power-on or the power-off (that is, a situation, such as the start or the end of a class) in response to the sensing of the detected state or the lost state.

Patterns of transition in reception intensity in the portable terminal 10 in a case where the beacon 30 is used in a location-designated manner and in a case where the beacon 30 is used in a situation-designated manner will next be described with reference to FIGS. 3A, 3B, 3C, and 3D. FIGS. 3A, 3B, 3C, and 3D are each a chart for explaining an example of a pattern of transition in reception intensity corresponding to a scene of usage.

FIG. 3A illustrates a pattern of transition in the reception intensity of radio waves received from the beacon 30 used in a location-designated manner for a case where a detected state is sensed when a user of the portable terminal 10 approaches the beacon 30.

If the beacon 30 is used in a location-designated manner, as illustrated in FIG. 3A, reception intensity increases as a user of the portable terminal 10 approaches the beacon 30. When the reception intensity exceeds a predetermined threshold, a detected state is sensed. Thus, a pattern of transition in the reception intensity of radio waves received from the beacon 30 used in a location-designated manner for a case where a detected state is sensed is expressed as, for example, a sigmoid function which increases over time.

FIG. 3B illustrates a pattern of transition in the reception intensity of radio waves received from the beacon 30 used in a location-designated manner for a case where a lost state is sensed when a user of the portable terminal 10 moves away from the beacon 30.

If the beacon 30 is used in a location-designated manner, as illustrated in FIG. 3B, reception intensity decreases as a user of the portable terminal 10 moves away from the beacon 30. When the reception intensity drops to not more than the predetermined threshold, a lost state is sensed. Thus, a pattern of transition in the reception intensity of radio waves received from the beacon 30 used in a location-designated manner for a case where a lost state is sensed is expressed as, for example, a sigmoid function which decreases over time.

FIG. 3C illustrates a pattern of transition in the reception intensity of radio waves received from the beacon 30 used in a situation-designated manner for a case where a detected state is sensed when the beacon 30 is powered on.

If the beacon 30 is used in a situation-designated manner, as illustrated in FIG. 3C, for example, when the beacon 30 is powered on at a time $t_1$, reception intensity at the time $t_1$ exceeds the predetermined threshold, and a detected state is sensed. Thus, a pattern of transition in the reception intensity of radio waves received from the beacon 30 used in a situation-designated manner for a case where a detected state is sensed is expressed as, for example, a step function which increases at the time $t_1$ with the power-on.

FIG. 3D illustrates a pattern of transition in the reception intensity of radio waves received from the beacon 30 used in a situation-designated manner for a case where a lost state is sensed when the beacon 30 is powered off.

If the beacon 30 is used in a situation-designated manner, as illustrated in FIG. 3D, for example, when the beacon 30 is powered off at a time $t_2$, reception intensity at the time $t_2$ drops to not more than the predetermined threshold, and a lost state is sensed. Thus, a pattern of transition in the reception intensity of radio waves received from the beacon 30 used in a situation-designated manner for a case where a lost state is sensed is expressed as, for example, a step function which decreases at the time $t_2$ with the power-off.

As described above, a pattern of transition in reception intensity, for which a detected state or a lost state is sensed in the portable terminal 10, depends on how the beacon 30 is used. Thus, in the service provision system 1 according to the present embodiment, whether to control execution of the application 50 is judged based on a reference profile obtained by simplifying a pattern of transition for a case where a lost state (or a detected state) is sensed which is determined by the beacon 30.

That is, in the service provision system 1 according to the present embodiment, if a lost state (or a detected state) is sensed in the portable terminal 10, a profile obtained by simplifying a transition in reception intensity when the lost state (or the detected state) is sensed is created. In the service provision system 1 according to the present embodiment, the created profile is compared with a reference profile obtained by simplifying a pattern of transition for a case where a lost state (a detected state) is sensed, and execution of the application 50 is controlled in accordance with a result of the comparison.

The above-described configuration allows inhibition of the application 50 from being ended, for example, even if a lost state is momentarily sensed in the portable terminal 10 due to occurrence of fluctuations in radio waves sent out from the beacon 30, or the like. That is, the service provision system 1 according to the present embodiment allows improvement of the quality of a service, in which the application 50 provides various functions or content, with use of the beacon 30.

The service provision system 1 according to the present embodiment has a "preparation phase" in which a reference profile for each beacon 30 is created and stored in the management apparatus 20 and an "operation phase" in which execution of the application 50 is controlled based on the reference profiles.

Figure 4:
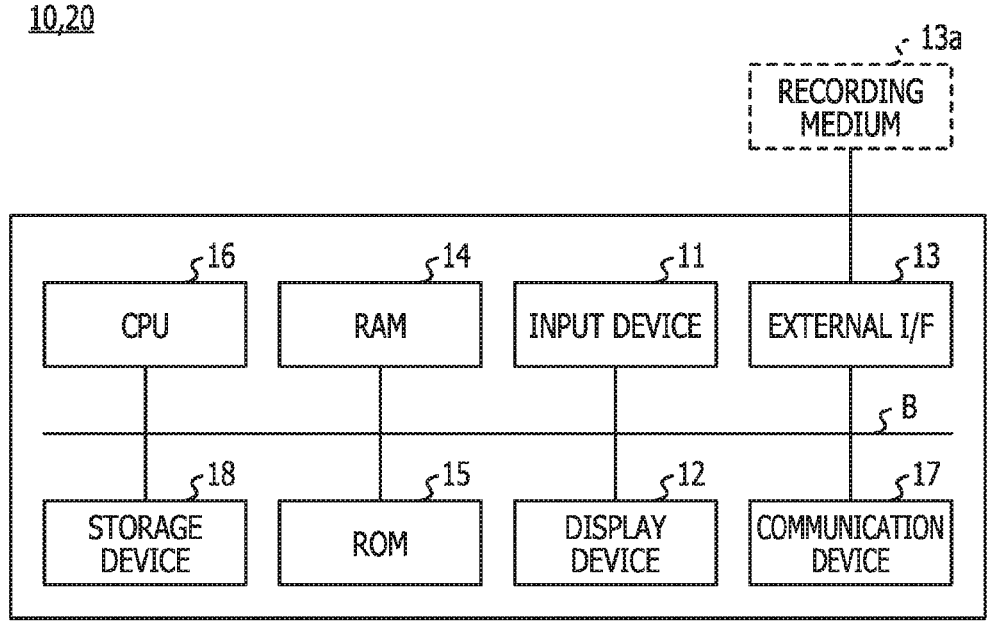
FIG. 4 is a diagram illustrating an example of the hardware configuration of each of a portable terminal and a management apparatus according to the present embodiment.

The hardware configuration of each of the portable terminal 10 and the management apparatus 20 according to the present embodiment will next be described with reference to FIG. 4. FIG. 4 is a diagram illustrating an example of the hardware configuration of each of a portable terminal and a management apparatus according to the present embodiment. The portable terminal 10 and the management apparatus 20 have the same hardware configuration. Thus, the hardware configuration of the portable terminal 10 will be mainly described hereinafter.

The portable terminal 10 includes an input device 11, a display device 12, an external I/F 13, a random access memory (RAM) 14, a read only memory (ROM) 15, a central processing unit (CPU) 16, a communication device 17, and a storage device 18. These pieces of hardware are coupled to one another by a bus B.

The input device 11 is a touch panel or the like and is used to input various operation signals to the portable terminal 10. The input device 11 may include, for example, a keyboard, a mouse, and the like. The display device 12 is a display or the like and displays various processing results. The management apparatus 20 may connect to the bus B and use the input device 11 and/or the display device 12, as appropriate.

The external I/F 13 is an interface with an external apparatus. Examples of the external apparatus include a recording medium 13a. With this configuration, the portable terminal 10 is capable of readout from and/or writing to the recording medium 13a via the external I/F 13. Examples of the recording medium 13a include an SD memory card and a USB memory. In addition, a compact disk (CD), a digital versatile disk (DVD), or the like may be used as the recording medium 13a.

The RAM 14 is a volatile semiconductor memory which temporarily stores a program and data. The ROM 15 is a nonvolatile semiconductor memory which is capable of holding data even after power-off. The CPU 16 is a computing unit which reads a program or data from, for example, the storage device 18, the ROM 15, or the like onto the RAM 14 and executes various processes.

The communication device 17 is an interface for connecting the portable terminal 10 to the network N. The communication device 17 is, for example, a BLE chip or the like and is an interface for receiving radio waves from the beacon 30. With the communication device 17, the portable terminal 10 is capable of communicating with the management apparatus 20 and of receiving radio waves from the beacon 30.

The storage device 18 is a nonvolatile memory which stores a program or data. Examples of a program or data to be stored in the storage device 18 include an operating system (OS) as basic software and various programs (the visit sensing program 40, the application 50, and the management program 60, for example).

The portable terminal 10 and the management apparatus 20 according to the present embodiment each have the hardware configuration illustrated in FIG. 4, which implements various processes to be described later.

Figure 5:
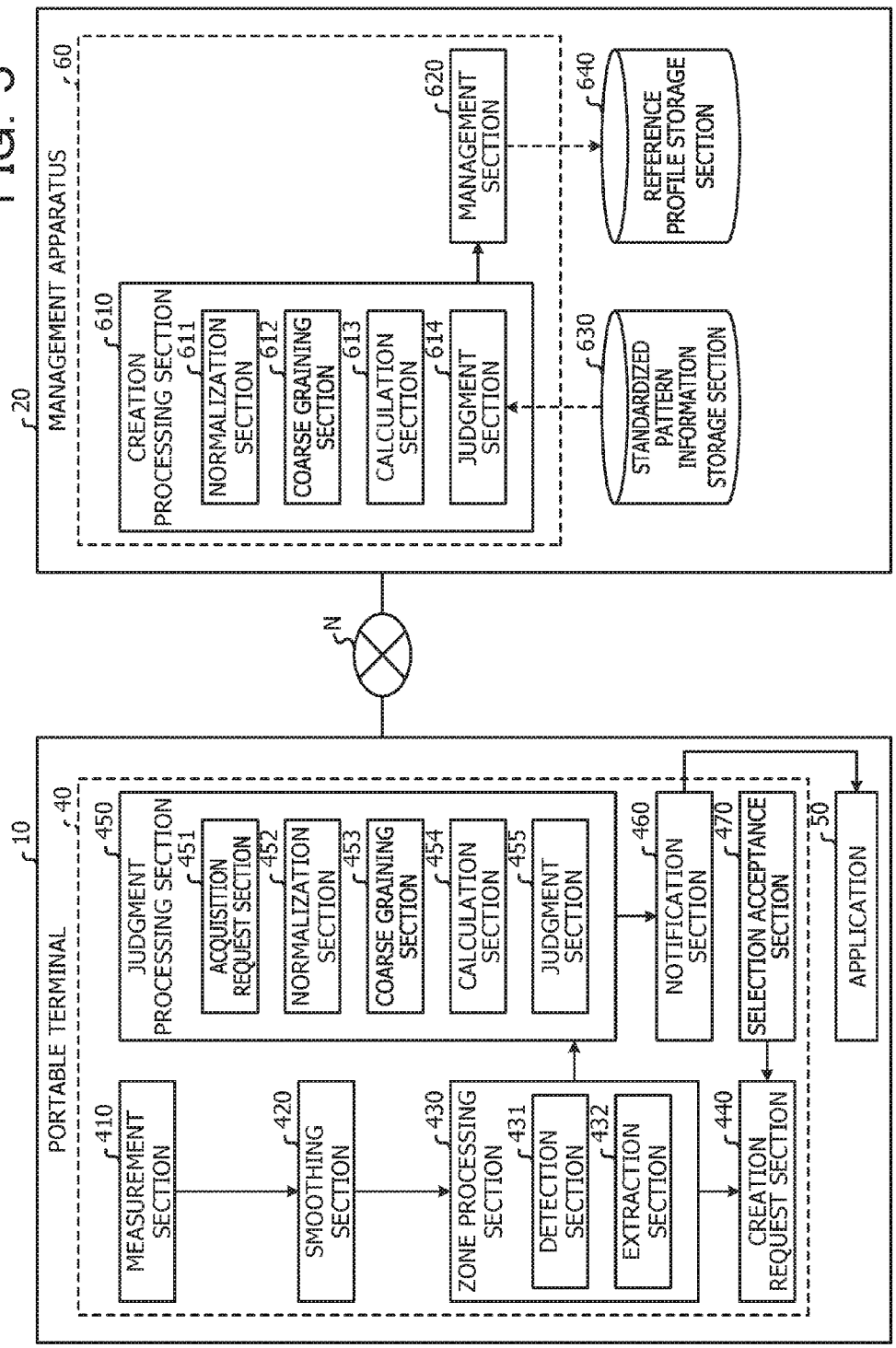
FIG. 5 is a diagram illustrating the functional configuration of the service provision system according to the present embodiment.

The functional configuration of the service provision system 1 according to the present embodiment will next be described with reference to FIG. 5. FIG. 5 is a diagram illustrating an example of the functional configuration of a service provision system according to the present embodiment.

The portable terminal 10 includes a measurement section 410, a smoothing section 420, a zone processing section 430, a creation request section 440, a judgment processing section 450, a notification section 460, and a selection acceptance section 470. Each section is implemented by a process which the visit sensing program 40 installed on the portable terminal 10 causes the CPU 16 to execute.

The measurement section 410 measures the reception intensity of radio waves received from the beacon 30 and creates a piece of transition information indicating a chronological transition in the reception intensity. A radio wave received from the beacon 30 includes a beacon ID of the beacon 30.

The smoothing section 420 smoothes the piece of transition information created by the measurement section 410 by calculating a moving average.

The zone processing section 430 extracts a zone with a change in reception intensity across a predetermined threshold in the piece of transition information smoothed by the smoothing section 420 and creates a piece of change zone information. The zone processing section 430 includes a detection section 431 and an extraction section 432.

If the smoothed piece of transition information has a change in reception intensity across the predetermined threshold, the detection section 431 detects the change. That is, the detection section 431 detects a change in reception intensity, for which a detected state or a lost state is sensed. The extraction section 432 extracts a change zone including the change in reception intensity detected by the detection section 431 and creates a piece of change zone information.

A change zone is a zone which includes a change in reception intensity, for which a detected state or a lost state is sensed, and a zone sandwiched between stationary zones (each of which has a change in reception intensity within a predetermined range in a smoothed piece of transition information). That is, a piece of change zone information is a piece of information indicating a transition in reception intensity in a specific zone, for which a detected state or a lost state is sensed.

The creation request section 440 transmits a request for creation of a reference profile to the management apparatus 20 in the preparation phase. The request for creation includes the piece of change zone information created by the zone processing section 430.

The judgment processing section 450 creates a profile based on the piece of change zone information created by the zone processing section 430 in the operation phase. The judgment processing section 450 judges whether to control execution of the application 50, based on the profile and a reference profile in the operation phase. The judgment processing section 450 includes an acquisition request section 451, a normalization section 452, a coarse graining section 453, a calculation section 454, and a judgment section 455.

The acquisition request section 451 transmits a request for acquisition of a reference profile for the beacon 30, for which the reception intensity is measured by the measurement section 410, to the management apparatus 20. The request for acquisition includes the beacon ID of the beacon 30, for which the reception intensity is measured by the measurement section 410.

The normalization section 452 normalizes the piece of change zone information created by the zone processing section 430. That is, the normalization section 452 performs normalization such that reception intensity and time in the piece of change zone information are not less than 0 and not more than 1.

The coarse graining section 453 coarsely grains the normalized piece of change zone information and creates a profile. The term coarse graining here refers to discretizing the normalized piece of change zone information such that the range of each of reception intensity and time is divided into intervals of predetermined width (on a predetermined scale). In other words, the coarse graining section 453 forms the normalized piece of change zone information into a mosaic pattern with a predetermined square width to reduce resolution (resolving power or the amount of information).

To what extent the resolution of the normalized piece of change zone information is reduced is determined by a division parameter. For example, if the division parameter is 4, the coarse graining section 453 coarsely grains the normalized piece of change zone information at resolution of 4 (2×2) squares. For example, if the division parameter is 16, the coarse graining section 453 coarsely grains the normalized piece of change zone information at resolution of 16 (4×4) squares.

The calculation section 454 calculates a Hamming distance between the profile created by the coarse graining section 453 and the reference profile corresponding to the beacon ID of the beacon 30, for which the reception intensity is measured. The judgment section 455 judges whether to control execution of the application 50 corresponding to the beacon ID, based on the Hamming distance calculated by the calculation section 454.

If the judgment section 455 judges that execution of the application 50 is to be controlled, the notification section 460 notifies the application 50 of an event for executing the application 50 or an event for ending execution.

That is, the notification section 460 pinpoints the application 50 based on, for example, the beacon ID of the beacon 30, for which the reception intensity is measured, and notifies the pinpointed application 50 of an event.

The selection acceptance section 470 accepts a beacon ID included in a radio wave received from the beacon 30 and a pattern ID of a standardized pattern which is selected by a user in the preparation phase. The standardized pattern here is a typical pattern of transition in reception intensity for a case where a detected state or a lost state is sensed in the portable terminal 10 in accordance with how the beacon 30 is used.

As described above, the service provision system 1 according to the present embodiment has two ways of preparing a reference profile: creating the reference profile based on a piece of change zone information created by the zone processing section 430; and selecting a standardized pattern defined in advance as the reference profile. Which way to use is determined for each beacon 30 by a user of the portable terminal 10, an installer of the beacon 30, an administrator of the service provision system 1, or the like.

The management apparatus 20 includes a creation processing section 610 and a management section 620. Each section is implemented by a process which the management program 60 installed on the management apparatus 20 causes the CPU 16 to execute.

The management apparatus 20 includes a standardized pattern information storage section 630 and a reference profile storage section 640. Each storage section is implementable using the storage device 18.

Upon receipt of a request for creation of a reference profile from the portable terminal 10, the creation processing section 610 creates a reference profile based on a piece of change zone information included in the request for creation in the preparation phase. The creation processing section 610 includes a normalization section 611, a coarse graining section 612, a calculation section 613, and a determination section 614.

The normalization section 611 normalizes the piece of change zone information included in the request for creation of a reference profile. The coarse graining section 612 coarsely grains the piece of change zone information normalized by the normalization section 611 and a piece of standardized pattern information stored in the standardized pattern information storage section 630.

The coarse graining section 612 coarsely grains the normalized piece of change zone information using a division parameter which is determined by the determination section 614 to create a reference profile.

The calculation section 613 calculates a gain for the piece of change zone information and the piece of standardized pattern information coarsely grained by the coarse graining section 612.

The gain here is an index value indicating the ratio of the amount of information of the piece of change zone information reduced by the coarse graining to the identifiability of a transition in reception intensity in the piece of change zone information. Thus, the gain is calculated by dividing a Hamming distance between the piece of change zone information and the piece of standardized pattern information that are coarsely grained by the division parameter at the time of the coarse graining of the piece of change zone information and the piece of standardized pattern information by the coarse graining section 612.

The determination section 614 determines the division parameter used to create a reference profile based on the gain calculated by the calculation section 613. A piece of change zone information coarsely grained by the coarse graining section 612 forms into a reference profile with use of the division parameter determined by the determination section 614.

The management section 620 stores the reference profile created by the creation processing section 610 in the reference profile storage section 640 in association with a beacon ID included in the request for creation of a reference profile. Upon receipt of a request for acquisition of a reference profile from the portable terminal 10, the management section 620 acquires a reference profile corresponding to a beacon ID included in the request for acquisition from the reference profile storage section 640.

The standardized pattern information storage section 630 stores a standardized pattern information table storing a piece of standardized pattern information indicating a typical pattern of transition in reception intensity for a case where a detected state or a lost state is sensed in the portable terminal 10 in accordance with how the beacon 30 is used.

A standardized pattern information table 630D storing a piece of standardized pattern information for a case where a lost state is sensed will be described with reference to FIG. 6. FIG. 6 is a chart schematically illustrating an example of a standardized pattern information table.

The standardized pattern information table 630D illustrated in FIG. 6 has, as data items, a pattern ID and a piece of standardized pattern information. The pattern ID is a piece of identification information for uniquely identifying a piece of standardized pattern information. In the example illustrated in FIG. 6, a piece of standardized pattern information is a piece of information indicating a pattern of transition in reception intensity for a case where a lost state is sensed.

For example, a piece of standardized pattern information which is associated with the pattern ID "P001" is a piece of information indicating a pattern of transition for a case where a lost state is sensed when the beacon 30 is used in a location-designated manner.

For example, a piece of standardized pattern information which is associated with the pattern ID "P002" is a piece of information indicating a pattern of transition for a case where a lost state is sensed when the beacon 30 is used in a situation-designated manner.

For example, a piece of standardized pattern information which is associated with the pattern ID "P003" is a piece of information indicating a pattern of transition for a case where a lost state is sensed through opening a door and exiting from an area surrounded by walls when the beacon 30 installed in the area is used in a location-designated manner.

As described above, a piece of standardized pattern information indicating a typical pattern in transition for a case where a detected state or a lost state is sensed in accordance with how the beacon 30 is used is stored in the standardized pattern information storage section 630.

The reference profile storage section 640 stores a reference profile table storing a reference profile created by the creation processing section 610.

A reference profile table 640D storing a reference profile for a case where a lost state is sensed will be described with reference to FIG. 7. FIG. 7 is a chart schematically illustrating an example of a reference profile table.

The reference profile table 640D illustrated in FIG. 7 has, as data items, a beacon ID and a reference profile. The beacon ID is a piece of identification information for uniquely identifying the beacon 30. In the example illustrated in FIG. 7, a reference profile is a reference profile for a case where a lost state is sensed based on the reception intensity of radio waves received from the beacon 30 corresponding to a beacon ID.

For example, a reference profile expressed in 5×5 resolution is associated with the beacon ID "B001". A reference profile expressed in 4×4 resolution is associated with the beacon ID "B002". As described above, a reference profile is obtained by coarsely graining a piece of change zone information indicating a transition in reception intensity for a case where a detected state or a lost state is sensed at resolution based on a division parameter.

As described above, a reference profile for a case where a detected state or a lost state is sensed is stored for each beacon 30 in the reference profile storage section 640.

Figure 8:
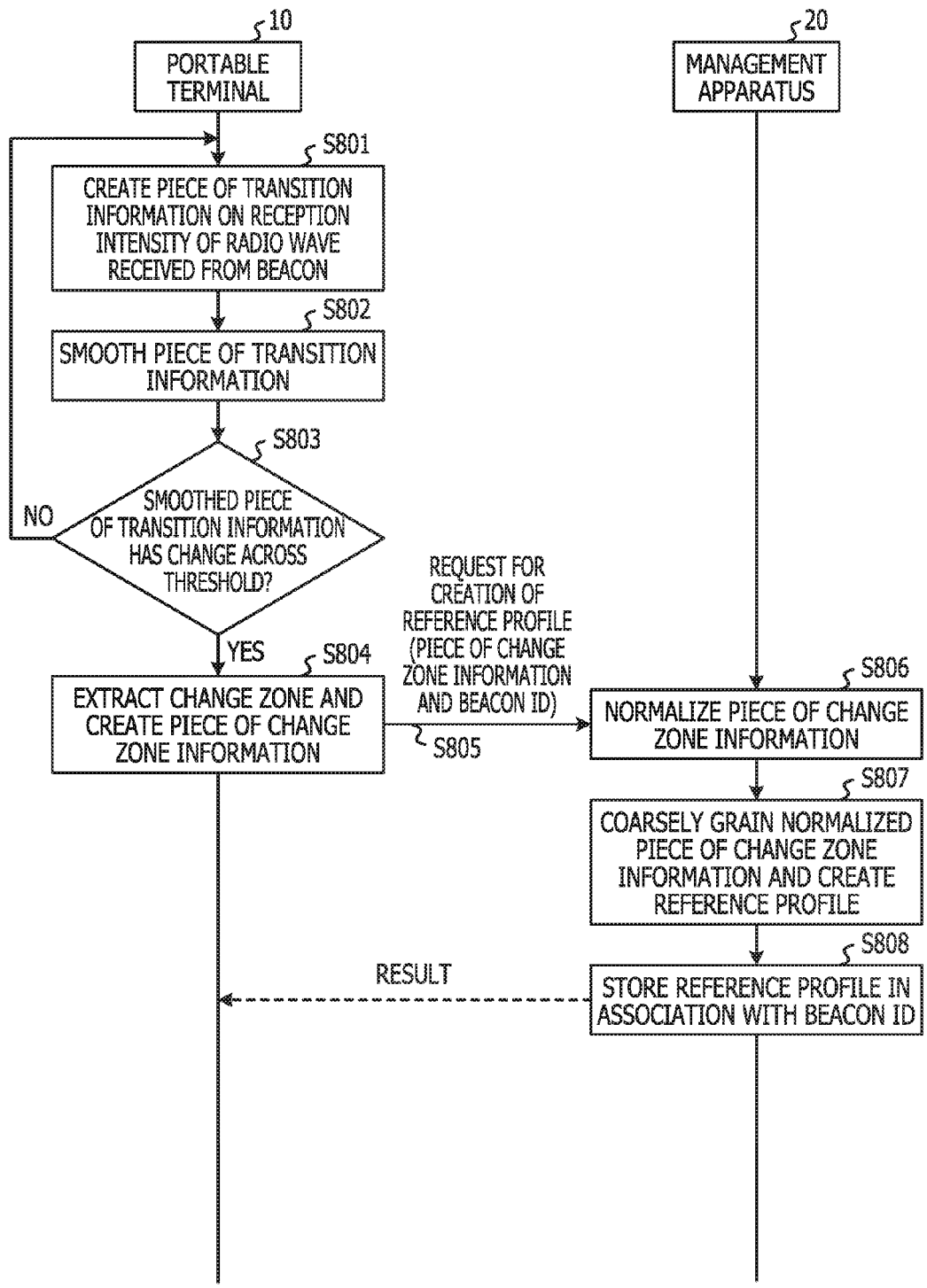
FIG. 8 is a chart illustrating an example of a reference profile storage process according to the present embodiment.

The details of processing by the service provision system 1 according to the present embodiment will next be described. A process of creating and storing a reference profile by the management apparatus 20 based on the reception intensity of radio waves from the beacon 30 that is measured by the portable terminal 10 in the preparation phase will be described first with reference to FIG. 8. FIG. 8 is a chart illustrating an example of a reference profile storage process according to the present embodiment. Creation and storage of a reference profile for a case where a lost state is sensed in the portable terminal 10 will be described below.

The measurement section 410 of the portable terminal 10 first measures the reception intensity of radio waves received from the beacon 30 and creates a piece of transition information on the reception intensity (S801). Assume that the measurement section 410 creates a piece 1000 of transition information on the reception intensity from a time $t_1$ to a time $t_4$, as illustrated in FIG. 9A.

The smoothing section 420 of the portable terminal 10 calculates a moving average of reception intensity in the piece 1000 of transition information and creates a piece 1100 of transition information which is obtained by smoothing the piece 1000 of transition information, as illustrated in FIG. 9B (S802). Although a simple moving average may be calculated as the moving average, the present embodiment is not limited to this. For example, the smoothing section 420 may calculate various moving averages, such as a weighted moving average.

If the piece 1100 of transition information has a change in reception intensity across a threshold (that is, a change in reception intensity, for which a lost state is sensed), the zone processing section 430 of the portable terminal 10 detects the change in reception intensity by the detection section 431. If a change in reception intensity across the threshold is detected, the zone processing section 430 advances to S804. On the other hand, if no change in reception intensity across the threshold is detected, the zone processing section 430 returns to S801 (S803).

If a change in reception intensity across the threshold is detected by the detection section 431, the zone processing section 430 of the portable terminal 10 extracts a change zone which includes the detected change in reception intensity by the extraction section 432 to create a piece of change zone information (S804).

That is, the extraction section 432 extracts a zone from the time $t_2$ to the time $t_3$ (a change zone) sandwiched between a zone from the time $t_1$ to the time $t_2$ (a stationary zone) and a zone from the time $t_3$ to the time $t_4$ (a stationary zone) from the piece 1100 of transition information. The extraction section 432 creates a piece 1200 of change zone information indicating the change zone, as illustrated in FIG. 9C. In this manner, the zone processing section 430 creates the piece 1200 of change zone information indicating a transition in reception intensity when a lost state is sensed during use of the beacon 30, for which radio wave reception intensity is measured.

When the piece 1200 of change zone information is created by the zone processing section 430, the creation request section 440 of the portable terminal 10 transmits a request for creation of a reference profile to the management apparatus 20 (S805). The request for creation includes the piece 1200 of change zone information, and a beacon ID of the beacon 30, for which the reception intensity is measured by the measurement section 410 in S801.

Upon receipt of the request for creation of a reference profile, the creation processing section 610 of the management apparatus 20 normalizes the piece 1200 of change zone information included in the request for creation by the normalization section 611 (S806). That is, the normalization section 611 normalizes the piece 1200 of change zone information such that time and reception intensity in the piece 1200 of change zone information are, for example, not less than 0 and not more than 1. The piece 1200 of change zone information normalized by the normalization section 611 will be referred to as a "piece 1300 of change zone information" hereinafter.

As described above, with the normalization of the piece 1200 of change zone information, the piece 1300 of change zone information that does not depend on, for example, the walking speed of a user of the portable terminal 10, an absolute value of the radio wave reception intensity, and the like is created.

The creation processing section 610 of the management apparatus 20 coarsely grains the piece 1300 of change zone information to create a reference profile (S807). The details of the reference profile creation process in this step will be described later.

The management section 620 of the management apparatus 20 stores the reference profile created by the creation processing section 610 in the reference profile table 640D in associations with the beacon ID included in the request for creation of a reference profile (S808). With this configuration, a reference profile is managed for each beacon 30 in the management apparatus 20 of the service provision system 1 according to the present embodiment.

It is possible to implement creation and storage of a reference profile for a case where a detected state is sensed by the same processes as described above through detection of a change in reception intensity, for which a detected state is sensed, by the detection section 431 in S803.

Figure 10:
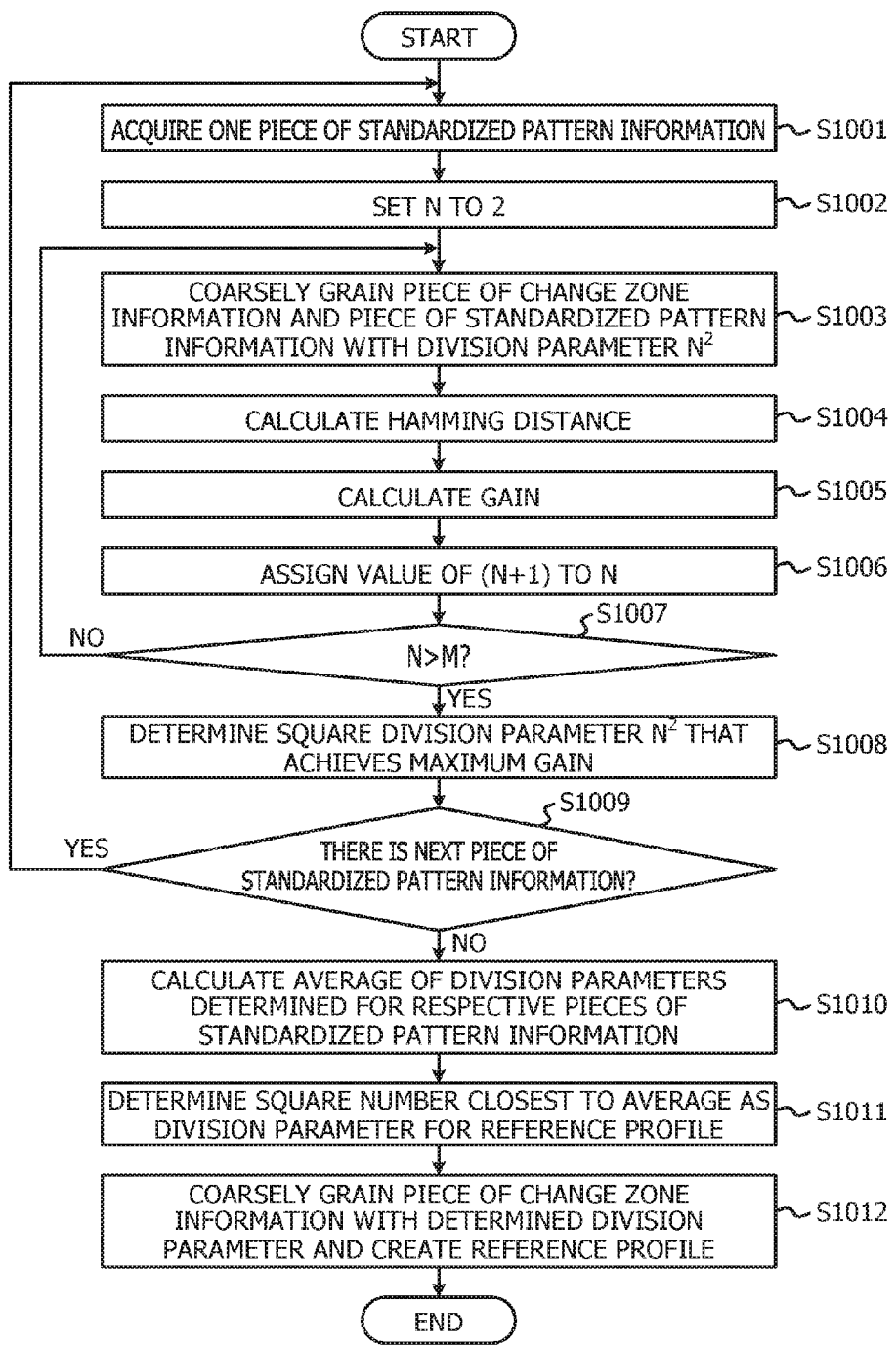
FIG. 10 is a chart illustrating the flow of a reference profile creation process according to the present embodiment.

The details of the above-described reference profile creation process in S807 will next be described with reference to FIG. 10. FIG. 10 is a chart illustrating the flow of a reference profile creation process according to the present embodiment.

The creation processing section 610 of the management apparatus 20 first acquires one piece of standardized pattern information from the standardized pattern information table 630D stored in the standardized pattern information storage section 630 (S1001).

The creation processing section 610 of the management apparatus 20 sets a variable N (N is a natural number) which is used to determine a division parameter to 2 (S1002).

The creation processing section 610 of the management apparatus 20 coarsely grains the piece 1300 of change zone information and the piece of standardized pattern information acquired from the standardized pattern information table 630D with a division parameter $N^2$ (S1003).

The creation processing section 610 of the management apparatus 20 calculates, by the calculation section 613, a Hamming distance between the piece 1300 of change zone information and the piece of standardized pattern information that are coarsely grained (S1004).

The creation processing section 610 of the management apparatus 20 calculates a gain by the calculation section 613 (S1005). That is, the calculation section 613 calculates the gain by dividing the Hamming distance calculated in S1004 by the division parameter $N^2$.

The creation processing section 610 of the management apparatus 20 adds 1 to the variable N (S1006).

The creation processing section 610 of the management apparatus 20 judges whether the variable N has exceeded a maximum number M which is set in advance. If the variable N is judged to have exceeded the maximum number M, the creation processing section 610 advances to S1008. On the other hand, if the variable N is judged not to have exceeded the maximum number M, the creation processing section 610 returns to S1003 (S1007). The value of the maximum number M is determined by, for example, a user of the portable terminal 10, an installer of the beacon 30, an administrator of the service provision system 1, or the like.

A result of executing the processes in S1003 to S1006 by the creation processing section 610 if M=6 will be described with reference to FIG. 11. FIG. 11 is a chart for explaining coarse graining, Hamming distance calculation, and gain calculation.

If N=2, the division parameter $N^2$ is 4. Thus, in S1003, the coarse graining section 612 coarsely grains the piece 1300 of change zone information and the piece of standardized pattern information acquired from the standardized pattern information table 630D at resolution of 2×2 squares.

Letting P(i,j) and Q(i,j) be values of squares as a component (i,j) of the piece 1300 of change zone information and a component (i,j) of the piece of standardized pattern information that are coarsely grained, P(i,j)=Q(i,j) holds for each combination of (i,j). Thus, the calculation section 613 calculates the Hamming distance and the gain to be 0.

If N=3, the division parameter $N^2$ is 9. Thus, in S1003, the coarse graining section 612 coarsely grains the piece 1300 of change zone information and the piece of standardized pattern information acquired from the standardized pattern information table 630D at resolution of 3×3 squares.

In this case, P(1,2)≠Q(1,2) and P(2,1)≠Q(2,1) obtain. Thus, the calculation section 613 calculates the Hamming distance to be 2 and the gain to be 0.22.

If N=4, the division parameter $N^2$ is 16. Thus, in S1003, the coarse graining section 612 coarsely grains the piece 1300 of change zone information and the piece of standardized pattern information acquired from the standardized pattern information table 630D at resolution of 4×4 squares.

In this case, P(1,2)≠Q(1,2), P(2,1)≠Q(2,1), P(3,3)≠Q(3,3), and P(4,2)≠Q(4,2) obtain. Thus, the calculation section 613 calculates the Hamming distance to be 4 and the gain to be 0.25. After that, if N=5 and if N=6, the gain is calculated in the same manner as described above.

As described above, the creation processing section 610 coarsely grains, for an acquired piece of standardized pattern information, the piece of standardized pattern information and the piece 1300 of change zone information using different division parameters and calculates a gain for each division parameter.

The creation processing section 610 of the management apparatus 20 determines, by the determination section 614, the division parameter $N^2$ that achieves a maximum gain, based on results of executing the processes in S1003 to S1006 (S1008). For example, among calculation results illustrated in FIG. 11, a gain of 0.32 when N=5 is largest. For this reason, the determination section 614 determines that a division parameter is 25. As described above, the determination section 614 determines a division parameter for each piece of standardized pattern information acquired from the standardized pattern information table 630D.

The creation processing section 610 of the management apparatus 20 then judges whether there is a next piece of standardized pattern information in the standardized pattern information table 630D. If it is judged that there is a next piece of standardized pattern information, the creation processing section 610 returns to S1001. On the other hand, if it is judged that there is no next piece of standardized pattern information, the creation processing section 610 advances to S1010 (S1009). That is, the creation processing section 610 executes the processes in S1001 to S1008 for each piece of standardized pattern information stored in the standardized pattern information table 630D.

The creation processing section 610 of the management apparatus 20 calculates an average of division parameters determined in S1008 for respective pieces of standardized pattern information by the determination section 614 (S1010). For example, if the division parameters determined in S1008 for the respective pieces of standardized pattern information are denoted by $N^2(1)$, $N^2(2)$, ..., $N^2(L)$, respectively, the determination section 614 calculates $\{N^2(1)+N^2(2)+ \ldots +N^2(L)\}/L$. Reference character L denotes the number of records as pieces of standardized pattern information stored in the standardized pattern information table 630D.

The creation processing section 610 of the management apparatus 20 determines a square number closest to the average calculated in S1010 as a division parameter used to create a reference profile by the determination section 614 (S1011). The square number closest to the average is, for example, such a square number that an absolute value of a difference of the square number from the average is the smallest.

The creation processing section 610 of the management apparatus 20 then coarsely grains the piece 1300 of change zone information using the determined division parameter by the coarse graining section 612 to create a reference profile (S1012).

In the above-described manner, in the service provision system 1 according to the present embodiment, the management apparatus 20 creates a reference profile. The reference profile thus created indicates a general shape of radio wave reception intensity for a case where a lost state or a detected state is sensed. It is thus possible to judge at high speed whether to control execution of the application 50 in the operation phase to be described later.

Figure 12:
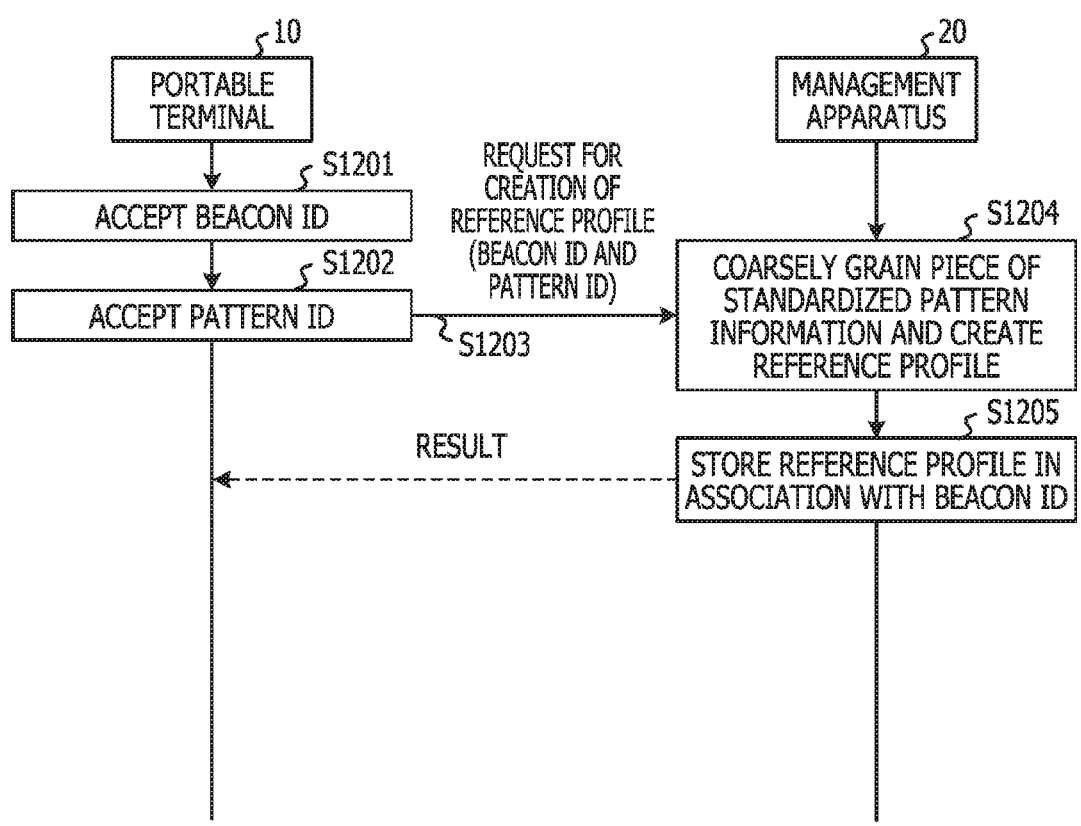
FIG. 12 is a chart illustrating another example of the reference profile storage process according to the present embodiment.

A process of selecting a standardized pattern by a user of the portable terminal 10 and creating and storing a reference profile based on the selected standardized pattern in the preparation phase will next be described with reference to FIG. 12. FIG. 12 is a chart illustrating another example of the reference profile storage process according to the present embodiment.

The selection acceptance section 470 of the portable terminal 10 accepts a beacon ID which is included in a radio wave received from the beacon 30 (S1201).

The selection acceptance section 470 of the portable terminal 10 accepts a pattern ID which indicates a standardized pattern selected by a user (S1202). For example, the selection acceptance section 470 accepts the pattern ID of the standardized pattern selected by the user on a standardized pattern selection screen 2000 illustrated in FIG. 13.

The portable terminal 10 may acquire a pattern ID and a piece of standardized pattern information to be displayed on the standardized pattern selection screen 2000 illustrated in FIG. 13 from the management apparatus 20 and display the standardized pattern selection screen 2000.

When the beacon ID and the pattern ID are accepted by the selection acceptance section 470, the creation request section 440 of the portable terminal 10 transmits a request for creation of a reference profile to the management apparatus 20 (S1203). The request for creation includes the beacon ID and the pattern ID accepted by the selection acceptance section 470.

The creation processing section 610 of the management apparatus 20 coarsely grains a piece of standardized pattern information having the pattern ID included in the request for creation with a division parameter set in advance by the coarse graining section 612 to create a reference profile (S1204). The division parameter may be, for example, designated by a user on the standardized pattern selection screen 2000 in S1202.

The management section 620 of the management apparatus 20 stores the reference profile created by the creation processing section 610 in the reference profile table 640D in associations with the beacon ID included in the request for creation of a reference profile (S1205). With this configuration, in the management apparatus 20 of the service provision system 1 according to the present embodiment, a reference profile based on a standardized pattern selected by a user is managed for each beacon 30. For example, if a user knows in advance how the beacon 30 is used, it is possible to easily create a reference profile by selecting a standardized pattern.

A process of controlling execution of the application 50 installed on the portable terminal 10 based on the reception intensity of radio waves from the beacon 30 that is measured in the portable terminal 10 in the operation phase will next be described with reference to FIG. 14. FIG. 14 is a chart illustrating an example of an application control process according to the present embodiment.

The measurement section 410 of the portable terminal 10 first measures the reception intensity of radio waves received from the beacon 30 and creates a piece of transition information on the reception intensity (S1401).

The smoothing section 420 of the portable terminal 10 calculates a moving average of reception intensity in the piece of transition information created by the measurement section 410 and smoothes the piece of transition information (S1402).

If the smoothed piece of transition information has a change in reception intensity across a threshold, the zone processing section 430 of the portable terminal 10 detects the change in reception intensity by the detection section 431. If a change in reception intensity across the threshold is detected, the zone processing section 430 advances to S1404. On the other hand, if no change in reception intensity across the threshold is detected, the zone processing section 430 returns to S1401 (S1403).

If a change in reception intensity across the threshold is detected by the detection section 431, the zone processing section 430 of the portable terminal 10 extracts a change zone including the detected change in reception intensity by the extraction section 432 to create a piece of change zone information (S1404).

The processes in S1401 to S1404 described above are the same as those in S801 to S804 described with reference to FIG. 8.

The judgment processing section 450 of the portable terminal 10 transmits a request for acquisition of a reference profile to the management apparatus 20 by the acquisition request section 451 (S1405). The request for acquisition includes a beacon ID of the beacon 30, for which the reception intensity is measured by the measurement section 410 in S1401.

Upon receipt of the request for acquisition of a reference profile, the management section 620 of the management apparatus 20 acquires a reference profile which is associated with the beacon ID included in the request for acquisition from the reference profile storage section 640 (S1406).

The management section 620 of the management apparatus 20 transmits the acquired reference profile to the portable terminal 10 as a transmission source of the request for acquisition of a reference profile in reply (S1407).

The judgment processing section 450 of the portable terminal 10 normalizes the piece of change zone information created in S1404 by the normalization section 452 (S1408). That is, the normalization section 452 normalizes the piece of change zone information such that time and reception intensity in the piece of change zone information are, for example, not less than 0 and not more than 1.

The judgment processing section 450 of the portable terminal 10 coarsely grains the normalized piece of change zone information by the coarse graining section 453 to create a profile (S1409). The coarse graining section 453 coarsely grains the normalized piece of change zone information using the same division parameter as that for the reference profile acquired from the management apparatus 20 to create a profile.

The judgment processing section 450 of the portable terminal 10 calculates a Hamming distance between the profile and the reference profile by the calculation section 454 (S1410).

The judgment processing section 450 of the portable terminal 10 judges, by the judgment section 455, whether the calculated Hamming distance is not more than a predetermined value. If it is judged that the Hamming distance is not more than the predetermined value, the judgment processing section 450 advances to S1412. On the other hand, if it is judged that the Hamming distance is more than the predetermined value, the judgment processing section 450 advances to S1413 (S1411). The predetermined value is determined by, for example, a user of the portable terminal 10, an administrator of the service provision system 1, or the like.

If the judgment section 455 judges that the Hamming distance is not more than the predetermined value, the notification section 460 of the portable terminal 10 notifies the application 50 of an event corresponding to a detected state or a lost state which is detected by the detection section 431 (S1412). The notification section 460 notifies, for example, the application 50 corresponding to the beacon ID of the beacon 30, for which the radio wave reception intensity is measured in S1401, of the event.

For example, if a change in reception intensity (that is, a change in which the reception intensity exceeds a threshold), for which a detected state is sensed, is detected in S1403, the notification section 460 notifies the application 50 of an event for executing the application 50.

For example, if a change in reception intensity (that is, a change in which the reception intensity drops to not more than the threshold), for which a lost state is sensed, is detected in S1403, the notification section 460 notifies the application 50 of an event for ending the application 50.

An event, notification of which is given by the notification section 460, is not limited to one for executing or ending the application 50 in question. For example, the notification section 460 may notify the application 50 in question of an event for executing predetermined processing (screen transition processing or image display processing, for example). As described above, the notification section 460 may give notification of an event to control the operation of the application 50 in question during execution.

If a change in reception intensity, for which a detected state is sensed, is detected in S1403, the notification section 460 may notify a server storing the application 50 of an event, and the application 50 may be downloaded. If a change in reception intensity, for which a lost state is sensed, is detected in S1403, the notification section 460 may delete the downloaded application 50.

If the judgment section 455 judges that the Hamming distance is more than the predetermined value, the judgment processing section 450 of the portable terminal 10 judges whether the reception intensity has returned to an original level after a lapse of a predetermined time. If it is judged that the reception intensity has returned to the original level, the judgment processing section 450 returns to S1401. On the other hand, if it is judged that the reception intensity has not returned to the original level, the judgment processing section 450 advances to S1412 (S1413).

That is, if a change in reception intensity, for which a detected state is sensed, is detected in S1403, the judgment processing section 450 judges whether the reception intensity has dropped to not more than the threshold after a lapse of the predetermined time. If a change in reception intensity, for which a lost state is sensed, is detected in S1403, the judgment processing section 450 judges whether the reception intensity has exceeded the threshold after a lapse of the predetermined time. In other words, the judgment processing section 450 judges in S1413 whether the reception intensity has experienced a momentary excess over the threshold value (or a momentary drop to not more than the threshold value). The predetermined time is, for example, 1 second or about several seconds.

As described above, in the service provision system 1 according to the present embodiment, a profile indicating a general shape of a transition in the reception intensity of radio waves received from the beacon 30 is compared with a reference profile for each beacon 30 indicating a general shape of a transition for a case where a detected state or a lost state is sensed. In the service provision system 1 according to the present embodiment, if a Hamming distance between a profile and a reference profile is not more than the predetermined value, execution of the application 50 is controlled in the portable terminal 10.

For this reason, for example, if a detected state or a lost state is momentarily sensed in the portable terminal 10 due to fluctuations in radio waves sent out from the beacon 30 or the like, execution of the application 50 may be inhibited. In particular, it is possible to inhibit execution of the application 50 from being ended by, for example, momentary sensing of a lost state in the portable terminal 10.

Thus, the service provision system 1 according to the present embodiment is capable of improving the quality of a service which controls execution of the application 50 in accordance with the location or the situation, using the beacon 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method executed by a system including a beacon and a terminal device configured to execute an application, the control method comprising:
   transmitting, by the beacon, a radio wave;
   receiving, by a processor included in the terminal device, the radio wave from the beacon for a predetermined period;
   generating a transition pattern indicating time variation of intensity of the received radio wave within the predetermined period;
   generating a time profile of intensity of the received radio wave by simplifying the generated transition pattern;
   determining whether the generated time profile corresponds to a reference profile; and
   executing the application corresponding to the beacon when it is determined that the generated time profile corresponds to the reference profile.

2. The control method according to claim 1,
   wherein the beacon is arranged in a specific area, and
   the plurality of reference profiles include a first reference profile that is generated based on a pattern of transition in the reception intensity measured when the computer enters into the specific area and a second reference profile that is generated based on a pattern of transition in the reception intensity measured when the computer exits from the specific area, and
   wherein the determining includes:
     executing the application when the profile corresponds to the first reference profile, and
     ending execution of the application when the profile corresponds to the second reference profile.

3. The control method according to claim 1,
   wherein the plurality of reference profiles include a third reference profile that is generated based on a pattern of transition in the reception intensity measured when the beacon is powered on and a fourth reference profile that is generated based on a pattern of transition in the reception intensity measured when the beacon is powered off, and wherein the judging includes:
   executing the application when the profile corresponds to the third reference profile, and
   ending execution of the application when the profile corresponds to the fourth reference profile.

4. The control method according to claim 1,
wherein the simplifying includes:
   generating change zone information by extracting a change zone including a zone indicating a change across a predetermined threshold, from the pattern of transition in the reception intensity of the received radio wave,
   normalizing the generated change zone information, and
   generating the profile by reducing resolution by applying a mosaic pattern having a predetermined square width to the normalized change zone information.

5. The control method according to claim 1,
wherein the determining includes:
   calculating a Hamming distance between the generated profile and at least one of the plurality of reference profiles, and
   determining whether the generated profile corresponds to any one of the plurality of reference profiles, based on whether the calculated Hamming distance is equal to or less than a predetermined value.

6. The control method according to claim 1,
wherein the system further includes a management apparatus coupled to the computer, and
wherein the control method further comprises:
   generating, by the computer, transition information on reception intensity of a radio wave received from the beacon,
   generating change zone information by extracting a change zone including a zone indicating a change across a predetermined threshold, from the generated transition information,
   transmitting a generation request of the reference profile that includes the generated change zone information and an identifier, by which the beacon is identified, to the management apparatus,
   normalizing, by the management apparatus, the change zone information in response to reception of the generation request,
   generating the reference profile by reducing resolution by applying a mosaic pattern having a predetermined square width to the normalized change zone information, and
   storing the generated reference profile in association with the identifier.

7. The control method according to claim 6, further comprising:
   simplifying, by the management apparatus, a standardized pattern indicating a temporal change in reception intensity defined in advance and the pattern of transition in the reception intensity of the received radio wave, using a predetermined square division number; and
   determining a square division number that is associated with the predetermined square width such that a ratio of a Hamming distance between the simplified standardized pattern and the simplified pattern of transition to the predetermined square division number is highest.

8. The control method according to claim 7,
wherein the standardized pattern includes a plurality of patterns different from each other that are generated for respective situations in the system, and each of the plurality of patterns are expressed in one or more straight lines.

9. A computer configured to execute an application, the computer comprising:
   a memory; and
   a processor coupled to the memory and configured to:
      receive a radio wave from a beacon for a predetermined period,
      generate a transition pattern indicating time variation of intensity of the received radio wave within the predetermined period,
      generate a time profile of intensity of the received radio wave by simplifying the generated transition pattern,
      determine whether the generated profile corresponds to a reference profile; and
      execute the application corresponding to the beacon when it is determined that the generated profile corresponds to the reference profile.

10. The computer according to claim 9,
wherein the beacon is arranged in a specific area, and
the plurality of reference profiles include a first reference profile that is generated based on a pattern of transition in the reception intensity measured when the computer enters into the specific area and a second reference profile that is generated based on a pattern of transition in the reception intensity measured when the computer exits from the specific area, and
wherein the processor is configured to:
   execute the application when the profile corresponds to the first reference profile, and
   end execution of the application when the profile corresponds to the second reference profile.

11. The computer according to claim 9,
wherein the plurality of reference profiles include a third reference profile that is generated based on a pattern of transition in the reception intensity measured when the beacon is powered on and a fourth reference profile that is generated based on a pattern of transition in the reception intensity measured when the beacon is powered off, and
wherein the processor is configured to:
   execute the application when the profile corresponds to the third reference profile, and
   end execution of the application when the profile corresponds to the fourth reference profile.

12. A non-transitory computer-readable storage medium storing a program that causes a processor included in a computer to execute a process, the process comprising:
   receiving a radio wave from a beacon for a predetermined period;
   generating a transition pattern indicating time variation of intensity of the received radio wave within the predetermined period;
   generating a time profile of intensity of the received radio wave by simplifying the generated transition pattern;
   determining whether the generated profile corresponds to a reference profile; and
   executing the application corresponding to the beacon when it is determined that the generated profile corresponds to the reference profile.

* * * * *